Sept. 6, 1932.　　　　C. P. ROBINSON　　　　1,875,763
COMPOUND SYNCHRONOUS MOTOR
Filed June 30, 1930　　　3 Sheets-Sheet 1

Inventor:
Cornelius P. Robinson,
By Chas. M. Thissen,
Atty.

Patented Sept. 6, 1932

1,875,763

UNITED STATES PATENT OFFICE

CORNELIUS P. ROBINSON, OF MANSFIELD, OHIO, ASSIGNOR TO THE IDEAL ELECTRIC & MANUFACTURING CO., OF MANSFIELD, OHIO, A CORPORATION OF OHIO

COMPOUND SYNCHRONOUS MOTOR

Application filed June 30, 1930. Serial No. 464,733.

My invention relates to electric motors, particularly of the alternating synchronous type, and one of the objects of my invention is the provision of an improved and efficient compact arrangement to effect a compound synchronous motor.

A further object of the invention is the provision of a compound synchronous motor and means for controlling the same to effect a high starting torque therefor.

Another object of the invention is the provision of means for mounting a starting motor within the compass of a synchronous motor.

Another object of the invention is the provision of a starting motor associated with a flywheel connected to a synchronous motor and both the starting motor and flywheel arranged within the compass of the synchronous motor.

A further object of the invention is the provision of a starting motor arranged concentrically with the synchronous motor with a flywheel also concentric with the synchronous motor and mounted for operation between the motors.

A further object of the invention is the provision of the starting motor for the synchronous motor and completely automatic system of control.

Other objects of the invention will appear hereinafter, the novel features and combinations being set forth in the appended claims.

In the accompanying drawings—

Fig. 4 is a wiring diagram to illustrate the connections for a slip ring alternating current starting motor; and Fig. 5 is a fragmentary elevational view to illustrate the support for the stator of the synchronous motor shown in Fig. 1 or Fig. 2.

Figure 1:
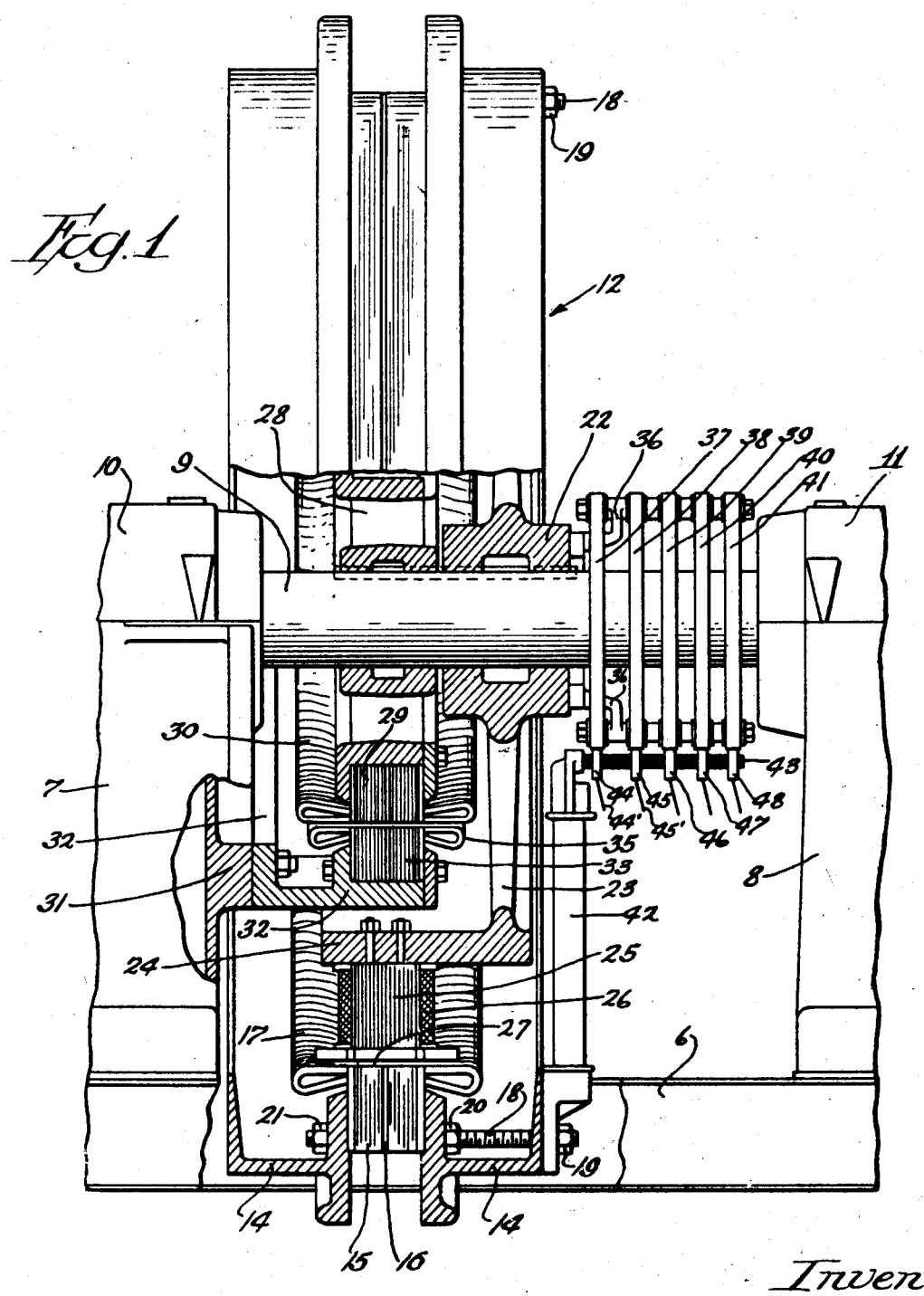
Fig. 1 is an elevation, partly in section, of my improved compound synchronous motor including a starting motor and a flywheel within the compass of a synchronous motor.

In Fig. 1, 6 designates the bed plate on which the bearing standards 7 and 8 are mounted. The motor shaft 9 is mounted in the bearings 10 and 11. Concentric with the shaft 9 is the stator 12 of the main synchronous motor. This stator is provided with feet 13, 13 as shown in Fig. 5 for secure bolting to the bed plate 6 in stationary position.

The stator 12 of the main syncronous motor may comprise concentric rings 14, 14 between which are located the laminations 15 with suitable ventilating openings located centrally thereof at 16. The windings 17 are arranged in transverse slots on the inner cylindrical face of the laminated portion 15. The rings 14, 14 and the laminations 15 are bolted together by means of the screws 18 and the nuts 19, 20 and 21.

It will thus be seen that the stator 12 embodying the windings 17 is mounted in stationary position on the bed plate 6 concentric with the motor shaft 9. This is true not only with respect to the form shown in Fig. 1, but also with respect to the modification shown in Fig. 2.

Keyed to the shaft 9 is the hub 22 of a flywheel 23. The cylindrical peripheral portion 24 is offset so as to project into the central portion of the stator 12. On the periphery of the flange 24 of the flywheel are secured the pole-pieces 25 and the rotor windings 26 of the main synchronous motor. The pole-pieces 25 are arranged to leave a small air gap at 27. The pole-pieces and the rotor windings 26 therefore in reality become a part of the fly wheel, although at the same time operating as the rotor of the main synchronous motor.

On the motor shaft 9 at the center of the stator 12 is keyed the rotor frame 28 of the starting motor. Such starting motor may be of the alternating current induction type or alternating current slip ring type. On the periphery of the rotor frame 28 are mounted the laminations 29 in transverse slots of which are arranged the rotor windings 30.

Secured to a bracket 31 extending from the standard 7, is a supporting frame 32 for receiving laminations 33 of the stator of the starting motor, the windings of the stator being shown at 35. The windings 35 are arranged in transverse slots in the laminations 33.

Secured to the hub 22 of the flywheel are bracket arms 36, 36 for carrying the slip rings 37, 38, 39, 40 and 41 concentric with the shaft 9 and rotatable therewith. Secured to the lower portion of one of the rings 14 is a post 42 for supporting at its upper end the insulating rod 43 to carry the brushes 44, 45, 46, 47 and 48. The number of the slip rings and the corresponding number of the brushes may be varied for varying conditions of operation of the compound synchronous motor. Five slip rings may be used when the system illustrated in Fig. 4 is adopted. The brushes 46, 47 and 48 respectively contact with the slip rings 39, 40 and 41, the slip rings being wired to the rotor windings 30 of the alternating starting motor. It will thus be seen that the slip rings 39, 40 and 41 and the connections between the same and the rotor windings 30 rotate with the shaft 9. The slip rings 37 and 38 may be connected to the windings 26 of the rotor attached to the flywheel 23. The windings 26 may constitute the field winding of the main synchronous motor as illustrated in Fig. 4 while the leads 44' and 45' represent the connections to the brushes 44 and 45 of Fig. 1. The connections for the stationary windings 35 and 17 may be arranged in any suitable manner and these connections are illustrated diagrammatically in Fig. 4.

Figure 2:
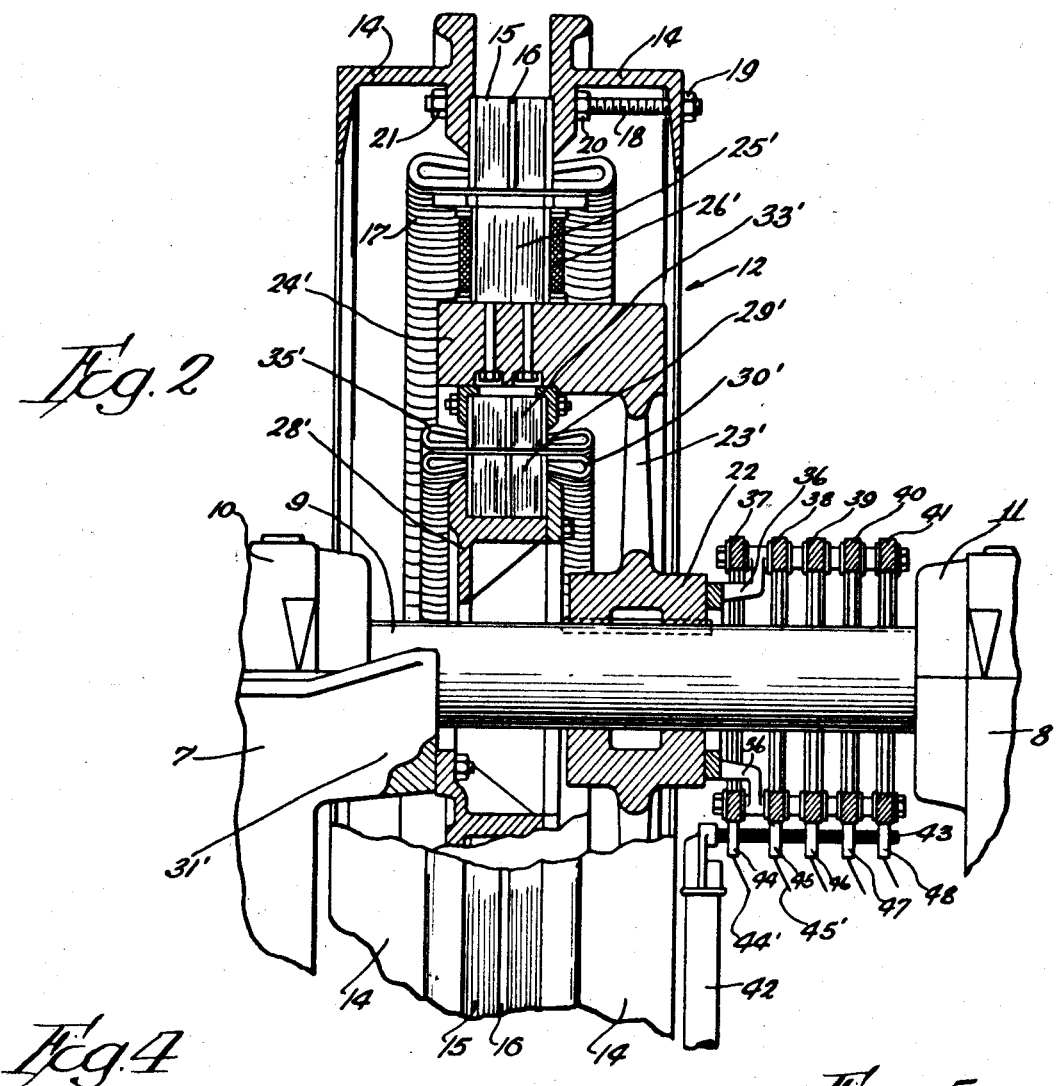
Fig. 2 is a sectional elevation of a compound synchronous motor embodying a modification of the structure shown in Fig. 1.

In Fig. 2 the flywheel 23' is provided with an inwardly extending flange 24' at its periphery, of greater thickness than the flange 24 of Fig. 1. The stator and rotor of the starting motor are reversed in their positions so that the effectiveness of the flywheel may be increased.

Mounted on a bracket 31' which extends from the standard 7 is the stator frame 28' of the starting motor. On the periphery of the stator frame 28' are mounted the laminations 29' with the windings 30' in transverse slots thereof. Secured to the inner periphery of the flange 24' of the flywheel as shown in Fig. 2, is the rotor of the starting motor comprising the laminations 33' and the windings 35' in transverse slots thereof.

On the outer periphery of the flange 24' of the flywheel are secured the pole-pieces 25' and the windings 26' of the main synchronous motor. The stator of the main synchronous motor is the same as shown in Fig. 1.

It will thus be seen that in Fig. 1 the parts that rotate with the shaft 9 are the rotor of the starting motor at the center of the stator thereof, the flywheel and the rotor of the main synchronous motor, the latter rotor being attached to the flywheel. In Fig. 2 the parts that rotate with the shaft 9 are the flywheel and the rotors of both the starting motor and the main synchronous motor. In both forms, however, the starting motor is concentric with the main synchronous motor and also with the flywheel, and in both forms the entire compound synchronous motor and the flywheel are within the compass of the stator frame of the main synchronous motor. The mounting of the slip rings and the brushes engaging the same may be the same in Fig. 2 as in Fig. 1.

However, the auxiliary motor both in the form shown in Fig. 1 and in the form shown in Fig. 2 may be of the squirrel cage type or synchronous motor type instead of the slip ring type. This is true whether the auxiliary rotor is mounted on the shaft 9 as shown in Fig. 1, or on the inside of the flange of the flywheel.

When used as a high starting torque auxiliary motor for purposes of synchronizing the main motor under heavy loads, the auxiliary motor should be either a high torque, high resistance squirrel cage motor or a slip ring motor. In such case the speed of the auxiliary motor should be higher than the speed of the synchronous motor so as to permit the synchronous motor to come up to a speed above its normal synchronous speed and then fall back into synchronism.

When the squirrel cage starting motor is used only two slip rings are necessary for establishing the circuit to the rotor of the main synchronous motor. When the starting motor is of the synchronous type, four slip rings should be used, two for the rotor of the starting motor and two for the rotor of the main motor.

Figure 3:
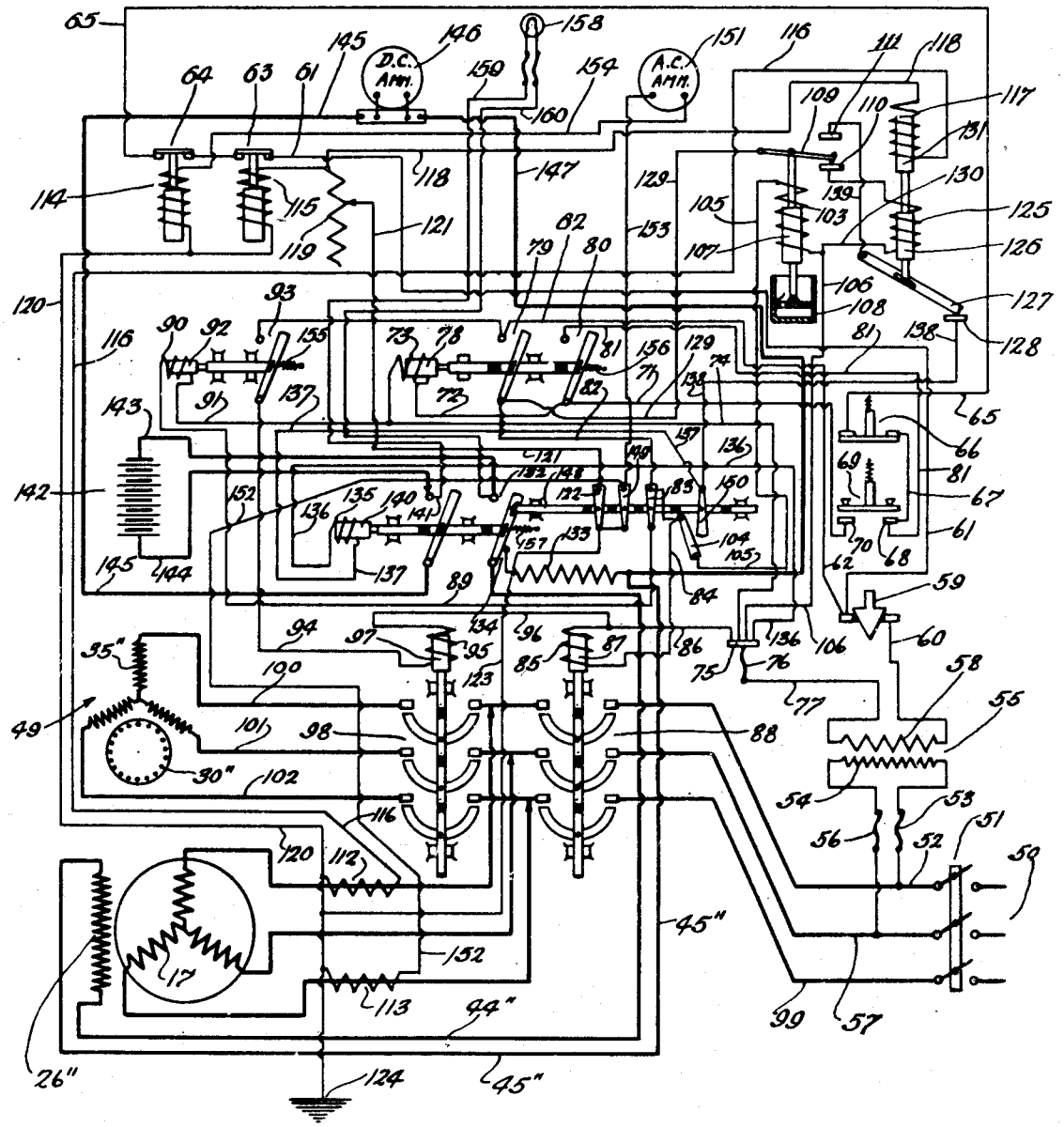
Fig. 3 represents a wiring diagram of the completely automatic system of control.

I will now describe the completely automatic system of control for the compound motor shown in Fig. 1 or Fig. 2:

The controlling system shown in Fig. 3 is such as to cause the rotor of the main synchronous motor to be brought above the normal synchronous speed of the main synchronous motor, then to apply direct current excitation to the field coils of the main motor while at the same time disconnecting the auxiliary motor, thereby causing the main motor to drop back into step with the power line. It should be understood that the auxiliary induction motor 49 comprising the squirrel cage winding 30'' and field windings 35'', is designed for high starting torque; that is, for starting duty only. It should also be understood that the induction motor 49 will have a fewer number of poles than the number of poles in the main synchronous motor so as to bring the main synchronous motor up to a speed above its normal synchronous speed.

In Fig. 3, 50 designates the main three-phase supply or incoming alternating current power line. When the main line disconnect switch 51 is closed a circuit will be established from the main 52 through the fuse 53 to the primary winding 54 of the transformer 55, the return circuit being through the fuse 56 to another supply main 57. It will thus be seen that the transformer 55 will be operated from one phase of the incoming alternating current power line.

The secondary winding 58 is connected to the various control circuits. When the safety plug switch 59 is in as shown in Fig. 3, potential will be supplied through the conductor 60 and the switch 59 to the conductors 61 and 62. The conductor 61 leads through the overload relay switches 63 and 64 to the conductor 65, the latter being connected through the stop switch 66 to the conductor 67 and contact 68.

When the starting switch or push-button 69 is pushed down to electrically connect the contacts 68 and 70 a circuit will be established through the conductor 71 and conductor 72 to the relay solenoid 73. The return circuit is through the conductor 74 to the junction 75, fuse 76 and conductor 77 to the other terminal of the secondary winding 58 of the transformer 55.

It will thus be seen that when the main line switch 51 is closed and the safety plug switch 59 is in, the solenoid 73 will be energized when the push-button switch 69 is closed. The energization of the solenoid 73 will cause it to move its plunger 78 toward the left and effect the closure of the switches 79 and 80. The closure of the switch 80 effects a holding circuit for the solenoid 73 so that the solenoid 73 remains energized after the push-button 69 is released. The holding circuit may be traced as follows: Conductors 61 and 65, switch 66, conductor 67, contact 68, conductor 81, switch 80, conductor 72, solenoid 73 and conductor 74 to conductor 77. In other words, as soon as the relay switch 80 is closed which results from the closure of the push-button switch 69, a holding circuit through the solenoid 73 is established because the switch 80 connects the solenoid 73 to the terminals of the secondary winding 58 independently of the switch 69.

The energization of the solenoid 73 also closes the switch 79. The closure of the switch 79 establishes a circuit through the conductor 62, switch 79, conductor 82, switch 83, conductor 84, solenoid 85, conductor 86 and conductor 77. The closure of the switch 79 therefore connects the solenoid 85 across the terminals of the secondary winding of the transformer 55.

When the solenoid 85 is energized the plunger 87 will be lifted to close the multiple main circuit breaker 88, thereby providing circuits from the incoming lines 50 to main motor windings 17.

When the switch 79 is closed a circuit will also be established through this switch, conductor 82, switch 83, conductor 89 to the solenoid 90 and thence through the conductors 91 and 74 to conductor 77 which is connected to the other terminal of the transformer 55.

Energization of the solenoid 90 will pull the plunger 92 to the left and close the switch 93 whereupon a circuit will be established from conductor 62 through switch 93 and conductor 94 to the solenoid 95, the circuit being completed through the conductors 96 and 86 to the conductor 77.

Energization of the solenoid 95 will lift the plunger 97 and effect the closure of the multiple switch 98. The multiple switch 88 is the main circuit breaker, whereas the switch 98 is an auxiliary switch. When these two switches 88 and 98 are closed circuits will be established through the conductors 52, 57 and 99 from the main supply line 50 to the conductors 100, 101 and 102 which are connected to the windings 35″ of the induction motor 49.

It should also be noted that when the switch 79 is closed a circuit will be established through the solenoid 103. This circuit may be traced from the conductor 62 through the switch 79, conductor 82, switch plate 104, conductor 105, solenoid 103 and conductor 106 to the conductor 77. When the solenoid 103 is energized its plunger 107 will be lifted against the action of the retarding dashpot 108. Connected to the upper end of the plunger 107 is a switch lever 109 movable from the position shown in Fig. 3 in engagement with the contact 110 upwardly into engagement with the contact 111. As soon as the solenoid 103 is energized the connection between the lever 109 and the contact 110 is interrupted but on account of the dashpot 108 the lever 109 will not engage the contact 111 until the main synchronous motor has reached a speed above its normal synchronous speed. The solenoid 103 and the parts actuated thereby constitute a time dashpot relay set to function a few seconds after the solenoid 103 has been energized so that the main motor will surely have time to reach a speed above its normal synchronous speed.

Another circuit is energized during the starting period. This circuit involves the series current transformers 112 and 113 and the overload relays 114 and 115. During the starting period only the overload relay 115 is in circuit and the A. C. ammeter and the overload relay 114 are out of circuit.

The overload relay 115 is supplied with current from the transformer 112. The circuit may be traced through conductor 116 to the current coil or solenoid 117 of the accelerating relay hereinafter more fully described; from solenoid 117 the circuit continues through the conductor 118 to the upper terminal of the by-pass or shunt resistance 119. From this point the current divides, depending upon the amount of resistance in the shunt. Part of the current goes through the solenoid 115, conductor 120, to the other terminal of the transformer 112. The other part of the current flows through the shunt resistance, conductor 121 to interlocking switch 122 and then through conductor 123 to ground 124, the other terminal of the transformer being connected to ground.

The solenoid 125 is adapted to act on its plunger 126 to effect a quick lifting of the switch lever 127 off the contact 128 immediately upon the closing of the switch 79. The circuit for the solenoid 125 may be traced through the conductor 62, switch 79, conductor 129, switch lever 109, contact 110, solenoid 125, and conductors 130 and 106 to the conductor 77. The electro-magnet comprising the solenoid 125 and plunger 126 is designed to act as a voltage coil to effect a quick pick up of the switch lever 127 so as to be disengaged from the contact 128. Although the closure of the switch 79 also energizes the solenoid 103 the dashpot 108 will prevent disengagement of the lever 109 from the contact 110 until after the solenoid 125 has acted to lift the lever 127 off the contact 128.

When the starting button 69 is pressed and the switch 88 is closed the inrush of current flowing through the transformer 112 is heavy. This current in the transformer 112 effects the energization of the solenoid 117. At the same time the voltage coil 125 has been energized and the result is a quick break at 128.

As the main motor approaches the desired speed the inrush current in the transformer 112 dies down and the plungers 131 and 126 drop as the solenoid 125 alone is not of sufficient strength to hold the plungers 131 and 126 up. In other words, in order to lift the switch lever 127 away from the contact 128 the solenoids 117 and 125 are so designed that both of them must be energized as specified and when the current in the solenoid 117 dies down the lever 127 will drop back onto the contact 128.

As above explained, the time relay comprising the solenoid 103 is so arranged that the main motor will surely have time to reach a speed above its synchronizing speed before the lever 109 engages the contact 111. By this time the lever 127 will have dropped back onto the contact 128.

The purpose of the relay solenoids 103, 117 and 125 and the parts operated thereby is to control the closing of a field switch 132 and other switches associated therewith. This field switch 132 must close at the proper time or otherwise the main motor instead of synchronizing will stall.

During the starting period the field winding 26" of the main synchronous motor is short circuited through the resistor 133 by means of the conductors 44" and 45" and the closed switch 134.

As above explained, the solenoids 125, 117 and 103 will operate the switches 127, 128 and 109, 110, 111 in predetermined sequence.

The result is that after the main motor has been brought up to a speed above its normal synchronous speed the switch lever 109 engages the contact 111 and the switch lever 107 engages the contact 128. When this occurs a circuit will be established through the solenoid 135. This circuit may be traced from the conductor 77 through conductor 136, solenoid 135, conductors 137, 138, switches 127, 128, conductor 139, switches 109, 111, conductor 129, switch 79 and conductor 62 to the conductor 60.

The energization of the solenoid 135 effects the pulling of the plunger 140 to the left to close the switches 141 and 132 and at the same time the interlocking switches are operated as hereinafter explained. The closure of the field switches 141 and 132 connects the storage battery 142 directly in circuit with the field winding 26" for D. C. excitation thereof. When the switch 132 is closed the switch 134 is opened, thus cutting out of circuit the short circuiting resistor 133. The storage battery circuit or D. C. excitation circuit of the field winding is through the conductors 143 and 144 between the battery and switches 141 and 132. From the switch 141 the D. C. excitation circuit extends through the conductor 145 to the D. C. ammeter 146 and then through the conductor 147 to the conductor 45". The conductor 44" is connected to the switch 132. The D. C. excitation circuit is shown on Fig. 3 by the heavy lines; heavy lines are also used on Fig. 3 to show the main supply circuits for the starting motor and the main synchronous motor.

When the solenoid 135 is energized and pulls the plunger 140 to the left the rod 148 is also pulled to the left to operate the switch levers 122, 149, 83 and 150. The switch levers 122, 149 and 83 co-operate with fixed contacts to constitute electric switches. The switch lever 150 is in position to engage the switch lever 104 and the latter engages the fixed contact to constitute an electric switch. Therefore upon the closure of the field switches 141 and 132 the interlocks 122, 149, 83 and 104 are opened. The opening of the interlock 122 removes the by-pass shunt resistance 119 by opening the circuit through the conductor 121 and thereupon the overload relay 115 is permitted to function normally.

The opening of the interlock 149 places the A. C. ammeter 151 and the other overload relay 114 in circuit with the transformer 113. The circuit will be from the transformer 113 through the conductors 152 and 153, A. C. ammeter 151, conductor 154, solenoid of relay 114, conductor 120 to the other terminal of the transformer 113. So long as the switch 149 is closed the solenoid of the relay 114 and the A. C. ammeter 151 will be short circuited as to the transformer 113 because while the switch was closed the terminals of the transformer 113 were connected by the conductors 152 and 123 directly through the switch 149.

The opening of the interlock 83 breaks the circuit of the solenoid 90 whereupon the spring 155 acts to open the switch 93. The opening of the switch 93 de-energizes the solenoid 95 whereupon the switch 98 drops to open position. When the switch 98 is opened the auxiliary starting motor is cut off from the power mains. The main synchronous motor has been brought up to a speed above the normal synchronous speed thereof and therefore when the starting motor is cut off from the power supply mains the main motor is free to decrease slightly in speed and lock into step with the power supply mains and continue to operate as a synchronous motor.

The opening of the interlock 104 by means of the lever 150 breaks the circuit of the solenoid 103 whereupon the switch lever 109 will drop into engagement with the contact 110. The dashpot 108 may be such as to make a quick downward movement of the plunger 107 when the solenoid 103 is de-energized. A holding circuit is now established for the solenoid 135 and the solenoid 85 to retain the field switches 141 and 132 closed and to retain the main circuit breaking switch 88 closed. The holding circuits may be traced as follows: Conductors 77, 86, solenoid 85, conductor 84 to switch lever 83, conductor 82 to switch 79 which at this time is closed, and thence to the conductor 62 which is connected to the other terminal of the transformer 55. It should be particularly noted that the holding circuit for the solenoid 73 is still closed and therefore the switch 79 is still closed. The holding circuit for the solenoid 135 may be traced from the conductor 77 through conductor 136, solenoid 135, conductor 137, switch levers 150 and 104 to switch lever 83, and thence through conductor 82 and switch 79 to conductor 62 which is connected to the other terminal of the transformer 55.

During the operation of the synchronous motor the solenoids 73, 114, 115, 135 and 85 are energized but the solenoids 90, 95, 103, 117 and 125 are de-energized.

The overload relays 114 and 115 are connected to the transformers 112 and 113. If either of the phases with which the transformers 112 and 113 are associated, receive too much current sufficient current will be sent through the overload relay magnets to open one of the switches 63 or 64. For instance, if the transformer 112 sends out more than predetermined amount of current due to an overload the relay 115 will open the switch 63. The circuit for the transformer 112 is through conductor 120, relay 115, conductor 118, solenoid 117 and conductor 116. The circuit for the transformer 113 is through conductor 120, solenoid of relay 114, conductor 154, A. C. ammeter 151, and conductors 153, 152 to the other terminal of the transformer 113. The ammeter 151 indicates the current flowing through the solenoid of the relay 114 while the synchronous motor is operating. By using the current transformer ratio as a multiplying factor the scale reading of the ammeter 151 may be made to represent the amperes drawn from the main lines.

When one of the switches 63 or 64 opens due to an overload as above explained, the holding circuit for the solenoid 73 will be interrupted and therefore the switch 79 will be opened and this in turn will interrupt the holding circuits of the solenoids 135 and 85. Consequently the main circuit breaking switch 88 will open and the current to the synchronous motor from the supply mains will be cut off.

In a similar manner the motor may be stopped by opening the push-button switch 66. The push-button switch 66 therefore acts as a stopping button, whereas the push-button 69 acts as a starting button. It should be particularly observed that the closure of the starting push-button 69 for a brief interval is all that is necessary to effect the operation of the starting motor which in turn starts the synchronous motor and brings it up to synchronous speed and beyond synchronous speed and then the starting motor is automatically cut out and the main synchronous motor maintained in operation as a synchronous motor. It will thus be seen that after the push-button 69 is operated the subsequent operations are entirely automatic throughout and the synchronous motor continues in operation until the stop button switch 66 is opened. When the solenoid 73 is de-energized the spring 156 may be relied on to open the switches 79 and 80. When the solenoid 135 is de-energized the spring 157 may be relied on to open the switches 141 and 132 and also move the bar 148 to its right-hand position to restore the interlocking switches to their positions shown in Fig. 3.

In order to obtain an indication of the condition of the storage battery 142, a pilot light 158 is connected to the battery terminals by means of the conductors 159 and 160 through fuses as indicated in Fig. 3. A voltmeter may be substituted for the pilot light 158. The D. C. ammeter 146 will be connected in the direct current excitation circuit when the switches 141 and 132 are closed so that the current flowing through the field circuit 26′ may be observed at any time.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. A compound electrical machine comprising means forming a stator, means carried in the stator and forming a main motor winding, additional means carried by the stator and forming an auxiliary motor winding concentrically disposed with respect to the main motor winding, a shaft rotatable with respect to the stator, a fly wheel carried by the shaft and revoluble therewith, said fly wheel having a portion extending between the auxiliary motor winding and the main motor winding, means carried by the flywheel and comprising a main motor winding adapted to cooperate with the main motor winding on the stator to provide a dynamo electric relationship therebetween and additional means revoluble with the shaft and comprising an auxiliary motor winding and adapted to co-operate with the auxiliary motor winding mounted on the stator to provide a dynamo electric relationship therebetween.

2. A compound electrical machine comprising means forming a stator, means carried in the stator and forming a main motor winding, additional means carried by the stator and forming an auxiliary motor winding concentrically disposed with respect to the main motor winding, a shaft rotatable with respect to the stator, a fly wheel having a portion extending between the auxiliary motor winding and the main motor winding, means carried by the fly wheel and comprising a main motor winding adapted to co-operate with the main motor winding on the stator to provide a dynamo electric relationship therebetween and additional means carried by the fly-wheel and comprising an auxiliary motor winding and adapted to cooperate with the auxiliary motor winding mounted on the stator to provide a dynamo electric relationship therebetween.

3. A compound electrical machine comprising a frame, a casing forming a stator mounted on the frame, means on the stator forming a winding, a shaft journaled in the frame and extending axially of the casing, a spider on the shaft having a rim extending adjacent the winding, means on the spider comprising a cooperating winding adapted to coact with the winding on the stator to provide a dynamo electrical relationship between the cooperating windings, a winding support mounted on the frame and extending within the rim of the spider, means on the support forming an auxiliary winding and means rotatable with the shaft adjacent said auxiliary winding and comprising a winding adapted to co-operate with the auxiliary winding to provide an auxiliary dynamo electrical relationship between the co-operating windings.

4. A compound motor comprising a frame, a casing forming a stator mounted on the frame, means on the stator forming a winding, a shaft journaled in the frame and extending axially of the casing, a spider on the shaft having a rim extending adjacent the winding, means on the spider comprising a cooperating winding adapted to coact with the winding on the stator to provide a dynamo electrical relationship between the cooperating windings, a winding support mounted on the frame and extending within the rim of the spider, means on the support forming an auxiliary winding and means rotatable with the shaft adjacent said auxiliary winding and comprising a winding adapted to co-operate with the auxiliary winding to provide an auxiliary dynamo electrical relationship between the co-operating windings, one of said co-operating pairs of windings forming a dynamo electric relationship of one character and the other of said co-operating pairs of windings comprising a dynamo electric relationship of a character different from that provided by the first pair.

5. A compound electrical machine comprising a frame, a casing forming a stator mounted on the frame, means on the stator forming a winding, a shaft journaled in the frame and extending axially of the casing, a spider on the shaft having a rim extending adjacent the winding, means on the spider comprising a cooperating winding adapted to coact with the winding on the stator to provide a dynamo electrical relationship between the cooperating windings, a winding support mounted on the frame and extending within the rim of the spider, means on the support forming an auxiliary winding and means rotatable with the shaft adjacent said auxiliary winding and comprising a winding adapted to co-operate with the auxiliary winding to provide an auxiliary dynamo electrical relationship between the co-operating windings, one of said co-operating pairs of windings forming a synchronous motor and the other of said co-operating pairs of windings comprising a dynamo electrical relationship of a character different than that provided by the first pair.

6. A compound electrical machine comprising a frame forming a bearing pedestal and an adjacent support, a pair of annular members mounted on the support adjacent the pedestal, a shaft rotatably mounted on the pedestal and extending concentrically with respect to the annular frame members, laminations clamped by and between said annular members, means forming a main stationary winding carried by said laminations, a support carried by the bearing pedestal and having an annular portion extending in concentric relationship with respect to the annular frame members, auxiliary laminations carried by said annular portion, means forming a stationary auxiliary winding carried by said auxiliary lamination, means forming a main revoluble winding, means to mount said winding for rotation with the shaft, said means being formed to support the main revoluble winding for movement adjacent the main stationary winding, means forming a rotatable auxiliary winding, means to mount said auxiliary rotatable winding for rotation with the shaft, said means being formed to support the shaft for movement adjacent the auxiliary stationary winding whereby to provide an electro magnetic relationship between each stationary winding and its corresponding shiftable winding.

7. A compound electrical machine as set forth in the previous claim wherein the annular support members for the stationary main windings are formed separate from but are secured to the frame in a predetermined relative position with respect to the bearing pedestal and the shaft carried thereby, and the support for the stationary auxiliary winding is formed as a separate part and secured in a predetermined relative position with respect to the bearing pedestal whereby the relationship and concentricity of the main and auxiliary windings may be accurately determined.

8. A compound electrical machine comprising a pair of spaced apart bearing pedestals and an intermediate support, a shaft carried by and between said pedestals, a casing demountably secured on the intermediate support in a predetermined position with respect to the shaft, an auxiliary support demountably secured to at least one of the bearing pedestals in a predetermined position with respect to the casing and the shaft, a stationary winding carried by the casing, an auxiliary stationary winding carried by the auxiliary support, a movable winding operatively associated with the stationary winding carried by the casing, a movable winding operatively associated with the winding carried by the auxiliary support and means rotatable with the shaft and support said windings in operating position.

In testimony whereof I have signed my name to this specification on this 26th day of June, A. D. 1930.

CORNELIUS P. ROBINSON.